(12) United States Patent
Yang

(10) Patent No.: US 11,188,910 B2
(45) Date of Patent: Nov. 30, 2021

(54) BLOCKCHAIN-BASED RECONCILIATION SYSTEM, METHOD, AND APPARATUS AND ELECTRONIC DEVICE

(71) Applicant: ADVANCED NEW TECHNOLOGIES CO., LTD., Grand Cayman (KY)

(72) Inventor: Fanding Yang, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/875,913

(22) Filed: May 15, 2020

(65) Prior Publication Data

US 2020/0279261 A1 Sep. 3, 2020

Related U.S. Application Data

(63) Continuation of application No. PCT/CN2020/071268, filed on Jan. 10, 2020.

(30) Foreign Application Priority Data

Jun. 3, 2019 (CN) .......................... 201910476140.9

(51) Int. Cl.
  *G06Q 20/40* (2012.01)
  *G06Q 20/38* (2012.01)
  (Continued)

(52) U.S. Cl.
  CPC ......... *G06Q 20/401* (2013.01); *G06Q 20/065* (2013.01); *G06Q 20/382* (2013.01);
  (Continued)

(58) Field of Classification Search
  CPC .. G06Q 20/401; G06Q 20/065; G06Q 20/382; G06Q 2220/00; H04L 9/0637;
  (Continued)

(56) References Cited

U.S. PATENT DOCUMENTS 10,332,106 B2    6/2019  Ozvat et al.
10,346,843 B2    7/2019  Ozvat et al.
        (Continued)

FOREIGN PATENT DOCUMENTS

AU       2017218390 A1    7/2018
CN       107491948 A     12/2017
        (Continued)

OTHER PUBLICATIONS

First Search dated May 7, 2020, issued in related Chinese Application No. 201910476140.9 (1 page).

(Continued)

*Primary Examiner* — Jacob C. Coppola

(57) ABSTRACT

Methods, systems, and apparatus, including computer programs encoded on computer storage media, for blockchain-based reconciliation are provided. One of the methods includes: uploading, by a service-provider node, transaction information to the blockchain, wherein the transaction information comprises an identifier of a service-consumer node and information associated with a transaction fee; initializing, by the service-provider node, a settlement state of the transaction fee in a ledger of the service-provider node; obtaining, by the service-provider node, a settlement result of a transaction fee associated with the transaction information based on an identifier of the service-provider node in the settlement result, wherein the settlement result is uploaded by the service-consumer node; and updating, by the service-provider node, the settlement state in the ledger of the service-provider node based on the settlement result upon confirming the settlement result.

20 Claims, 5 Drawing Sheets

(51) Int. Cl.
*H04L 9/06* (2006.01)
*G06Q 20/06* (2012.01)

(52) U.S. Cl.
CPC ....... *H04L 9/0637* (2013.01); *G06Q 2220/00* (2013.01); *H04L 2209/38* (2013.01)

(58) Field of Classification Search
CPC .............. H04L 2209/38; H04L 2209/56; H04L 9/3239
See application file for complete search history.

(56) References Cited

U.S. PATENT DOCUMENTS

| | | | |
|---|---|---|---|
| 10,572,866 B2 | 2/2020 | Course et al. | |
| 10,580,100 B2 | 3/2020 | Pierce et al. | |
| 2015/0081462 A1 | 3/2015 | Ozvat et al. | |
| 2015/0294379 A1 | 10/2015 | Giridharan et al. | |
| 2016/0035044 A1 | 2/2016 | Xu | |
| 2016/0292680 A1* | 10/2016 | Wilson, Jr. | G06Q 20/40 |
| 2017/0024715 A1 | 1/2017 | Gardner et al. | |
| 2017/0243177 A1* | 8/2017 | Johnsrud | G06Q 20/10 |
| 2017/0270493 A1 | 9/2017 | Lugli et al. | |
| 2018/0268401 A1* | 9/2018 | Ortiz | G06Q 20/204 |
| 2018/0293556 A1 | 10/2018 | Hyun et al. | |
| 2019/0087802 A1 | 3/2019 | Perkins et al. | |
| 2019/0266577 A1* | 8/2019 | Baldet | H04L 67/1042 |
| 2019/0340170 A1 | 11/2019 | Pierce et al. | |
| 2020/0177377 A1 | 6/2020 | Smith et al. | |

FOREIGN PATENT DOCUMENTS

| | | |
|---|---|---|
| CN | 108229926 A | 6/2018 |
| CN | 108712409 A | 10/2018 |
| CN | 108921558 A | 11/2018 |
| CN | 108985742 A | 12/2018 |
| CN | 109242453 A | 1/2019 |
| CN | 109417549 A | 3/2019 |
| CN | 110322348 A | 10/2019 |
| KR | 20160019462 A | 2/2016 |
| KR | 20190038561 A | 4/2019 |
| KR | 20190043117 A | 4/2019 |
| WO | 2018194378 A1 | 10/2018 |
| WO | 2019078622 A1 | 4/2019 |

OTHER PUBLICATIONS

First Office Action dated May 18, 2020, issued in related Chinese Application No. 201910476140.9, with English machine translation (19 pages).
Written Opinion and International Search Report for PCT Application No. PCT/CN2020/071268 made available to public dated Dec. 10, 2020.

* cited by examiner

BLOCKCHAIN-BASED RECONCILIATION SYSTEM, METHOD, AND APPARATUS AND ELECTRONIC DEVICE

CROSS-REFERENCE TO RELATED APPLICATION

This application is a continuation application of International Patent Application No. PCT/CN2020/071268, filed with the China National Intellectual Property Administration (CNIPA) on Jan. 10, 2020, which is based on and claims priority to and benefit of Chinese Patent Application No. 201910476140.9, filed with the CNIPA on Jun. 3, 2019. The entire contents of all of the above-identified applications are incorporated herein by reference.

TECHNICAL FIELD

The specification relates to the field of computer technologies, and in particular, to a blockchain-based reconciliation system, method, apparatus, storage medium, and an electronic device.

BACKGROUND

At present, reconciliation operations between financial institutions are usually performed as follows. A financial institution that provides a service (namely, a service provider) generates a fee bill based on transactions in a settlement cycle through calculation according to a settlement contract, and then provides the fee bill to a served financial institution, such as a financial institution receives the service, for reconciliation.

In the above reconciliation scenario, after obtaining the fee bill, the served financial institution needs to extract the transactions in a system of the served financial institution according to a settlement specification, and re-calculate according to the settlement contract. If a different calculation result is obtained, the served financial institution needs to contact the service provider to check the details, which is time consuming and affects the real-time fee settlement. In addition, if a fault occurs on the service provider and causes an abnormal fee calculation, the credit of the financial institution corresponding to the service provider may be significantly damaged.

Therefore, a reconciliation method is urgently needed to timely resolve problems of low efficiency in the existing reconciliation between financial institutions and significant time consumption caused by an abnormal reconciliation.

SUMMARY

Embodiments of the specification provide a blockchain-based reconciliation system, method, apparatus, storage medium, and an electronic device, to resolve problems of low efficiency in the existing reconciliation between financial institutions and significant time consumption caused by an abnormal reconciliation.

To resolve the foregoing technical problems, the embodiments of the specification are implemented as follows.

According to a first aspect, a blockchain-based reconciliation system is provided, including: a service-provider node and a service-consumer node, wherein the service-provider node uploads transaction information to a blockchain, wherein the transaction information comprises an identifier of the service-consumer node; and the service-consumer node monitors and obtains the transaction information based on the identifier of the service-consumer node; and the service-consumer node updates a ledger of the service-consumer node based on the transaction information if the service-consumer node confirms the transaction information.

According to a second aspect, a blockchain-based reconciliation method is provided, wherein the method is implemented on a service-provider node, and the method includes: uploading transaction information to a blockchain, wherein the transaction information comprises an identifier of the service-consumer node; the service-consumer node monitors and obtains the transaction information based on the identifier of the service-consumer node; and the service-consumer node updates a ledger of the service-consumer node based on the transaction information if the service-consumer node confirms the transaction information.

According to a third aspect, a blockchain-based reconciliation method is provided, wherein the method is implemented on a service-consumer node, and the method includes: monitoring and obtaining transaction information based on an identifier of the service-consumer node, wherein the transaction information is uploaded by a service-provider node to a blockchain, and the transaction information comprises the identifier of the service-consumer node; and updating a ledger of the service-consumer node based on the transaction information if confirming the transaction information.

According to a fourth aspect, a service-provider node is provided, including: an upload unit, for uploading transaction information to a blockchain, wherein the transaction information comprises an identifier of the service-consumer node; the service-consumer node monitors and obtains the transaction information based on the identifier of the service-consumer node; and the service-consumer node updates a ledger of the service-consumer node based on the transaction information if the service-consumer node confirms the transaction information.

According to a fifth aspect, a service-consumer node is provided, including: an obtaining unit, for monitoring and obtaining transaction information based on an identifier of the service-consumer node, wherein the transaction information is uploaded by a service-provider node to a blockchain, and the transaction information comprises the identifier of the service-consumer node; and an updating unit, for updating a ledger of the service-consumer node based on the transaction information if the transaction information is confirmed.

According to a sixth aspect, an electronic device is provided, including: a processor; and a memory configured to store computer executable instructions, wherein the executable instructions, when executed, cause the processor to perform the following operations: uploading transaction information to a blockchain, wherein the transaction information comprises an identifier of the service-consumer node; the service-consumer node monitors and obtains the transaction information based on the identifier of the service-consumer node; and the service-consumer node updates a ledger of the service-consumer node based on the transaction information if the service-consumer node confirms the transaction information.

According to a seventh aspect, a computer readable storage medium is provided, wherein the computer readable storage medium stores one or more programs, and the one or more programs, when executed by an electronic device including a plurality of application programs, cause the electronic device to perform the following operation: uploading transaction information to a blockchain, wherein the transaction information comprises an identifier of the service-consumer node; the service-consumer node monitors and obtains the transaction information based on the identifier of the service-consumer node; and the service-consumer node updates a ledger of the service-consumer node based on the transaction information if the service-consumer node confirms the transaction information.

According to an eighth aspect, an electronic device is provided, including: a processor; and a memory configured to store computer executable instructions, wherein the executable instructions, when executed, cause the processor to perform the following operations: monitoring and obtaining transaction information based on an identifier of the service-consumer node, wherein the transaction information is uploaded by a service-provider node to a blockchain, and the transaction information comprises the identifier of the service-consumer node; and updating a ledger of the service-consumer node based on the transaction information if confirming the transaction information.

According to a ninth aspect, a computer readable storage medium is provided, wherein the computer readable storage medium stores one or more programs, and the one or more programs, when executed by an electronic device including a plurality of application programs, cause the electronic device to perform the following operations: monitoring and obtaining transaction information based on an identifier of the service-consumer node, wherein the transaction information is uploaded by a service-provider node to a blockchain, and the transaction information comprises the identifier of the service-consumer node; and updating a ledger of the service-consumer node based on the transaction information if confirming the transaction information.

In a further aspect, a method for blockchain-based reconciliation, implemented on a blockchain comprising one or more service-provider nodes and one or more service-consumer nodes is provided. According to one embodiment, the method includes: uploading, by a service-provider node, transaction information to the blockchain, wherein the transaction information comprises an identifier of a service-consumer node and information associated with a transaction fee; initializing, by the service-provider node, a settlement state of the transaction fee in a ledger of the service-provider node; obtaining, by the service-provider node, a settlement result of a transaction fee associated with the transaction information based on an identifier of the service-provider node in the settlement result, wherein the settlement result is uploaded by the service-consumer node; and updating, by the service-provider node, the settlement state in the ledger of the service-provider node based on the settlement result upon confirming the settlement result.

In yet another aspect, a system for blockchain-based reconciliation is provided. According to one embodiment, the system comprises a processor and a non-transitory computer-readable storage medium storing instructions executable by the processor to cause the system to perform operations. The operations include: uploading, by a service-provider node, transaction information to the blockchain, wherein the transaction information comprises an identifier of a service-consumer node and information associated with a transaction fee, and the blockchain comprises one or more service-provider nodes and one or more service-consumer nodes; initializing, by the service-provider node, a settlement state of the transaction fee in a ledger of the service-provider node; obtaining, by the service-provider node, a settlement result of a transaction fee associated with the transaction information based on an identifier of the service-provider node in the settlement result, wherein the settlement result is uploaded by the service-consumer node; and updating, by the service-provider node, the settlement state in the ledger of the service-provider node based on the settlement result upon confirming the settlement result.

In further another aspect, a non-transitory computer-readable storage medium for blockchain-based reconciliation is provided. According to one embodiment, the medium is configured with instructions executable by one or more processors to cause the one or more processors to perform operations. The operations include: uploading, by a service-provider node, transaction information to the blockchain, wherein the transaction information comprises an identifier of a service-consumer node and information associated with a transaction fee, and the blockchain comprises one or more service-provider nodes and one or more service-consumer nodes; initializing, by the service-provider node, a settlement state of the transaction fee in a ledger of the service-provider node; obtaining, by the service-provider node, a settlement result of a transaction fee associated with the transaction information based on an identifier of the service-provider node in the settlement result, wherein the settlement result is uploaded by the service-consumer node; and updating, by the service-provider node, the settlement state in the ledger of the service-provider node based on the settlement result upon confirming the settlement result.

In one embodiment, the uploading the transaction information to the blockchain comprises: packaging the transaction information into a transaction block; and broadcasting the transaction block to one or more of the one or more service-provider nodes and the one or more service-consumer nodes for adding to the blockchain.

In one embodiment, the transaction information comprises a transaction contract, a transaction amount, a transaction fee, or a calculation rule of the transaction fee.

In one embodiment, subsequent to the service-provider node uploading the transaction information to the blockchain, the method or the operations further comprise: obtaining, by the service-consumer node, the transaction information based on the identifier of the service-consumer node; updating, by the service-consumer node, a ledger of the service-consumer node based on the obtained transaction information upon confirming the obtained transaction information.

In one embodiment, the updating a ledger of the service-consumer node based on the obtained transaction information comprises: adding the transaction information to the ledger of the service-consumer node; and initializing a settlement state of the transaction fee in the ledger of the service-consumer node.

In one embodiment, the method or the operations further comprise, prior to the service-provider node obtaining the settlement result of the transaction fee: uploading, by the service-consumer node, the settlement result of the transaction fee to the blockchain; and updating, by the service-consumer node, the settlement state of the transaction fee in the ledger of the service-consumer node based on the settlement result of the transaction fee.

In one embodiment, the method or the operations further comprise: receiving, by the service-provider node from the service-consumer node via a coordination node in the blockchain, a first confirmation completion message upon confirmation of the obtained transaction information; and sending, by the service-provider node to the service-consumer node via the coordination node, a second confirmation completion message upon confirmation of the settlement result.

The technical solutions used in the embodiments of the specification can achieve at least the following technical effects. A service provider and a service consumer may join a blockchain as nodes in the blockchain, namely, a service-provider node and a service-consumer node. In this way, during reconciliation between the service-provider node and the service-consumer node, the service-provider node may upload transaction information to the blockchain. The transaction information may carry an identifier of the service-consumer node. The service-consumer node can monitor and obtain the transaction information based on the identifier of the service-consumer node. The service-consumer node may update a ledger of the service-consumer node based on the transaction information if the service-consumer node confirms the transaction information. Once the service-provider node uploads the transaction information to the blockchain, a confirmation result of the transaction information can be obtained from the service-consumer node, and the transaction information is recorded only when confirmed. Therefore, the transaction information in the blockchain is highly reliable, and after the transaction information is generated, the service provider or the service consumer does not need to consume much time for confirmation.

BRIEF DESCRIPTION OF THE DRAWINGS

The accompanying drawings described herein are used for providing further understanding for this specification and constitute a part of the specification. Embodiments of the specification and descriptions thereof are used for explaining the specification and do not constitute any limitation to the specification.

DETAILED DESCRIPTION

To make the objectives, technical solutions, and advantages of the specification clearer, the following description clearly and completely describes the technical solutions of the specification with reference to specific embodiments of the specification and the corresponding accompanying drawings. Apparently, the described embodiments are only some embodiments rather than all the embodiments of the specification. All other embodiments obtained by a person of ordinary skill in the art based on the embodiments of the specification without creative efforts shall fall within the protection scope of the specification.

The technical solution provided by various embodiments of the specification will be described in detail below with reference to the accompanying drawings.

To resolve problems of low efficiency in the existing reconciliation between financial institutions and significant time consumption caused by an abnormal reconciliation, an embodiment of the specification provides a blockchain-based reconciliation system. The system includes a service-provider node and a service-consumer node.

Figure 1:
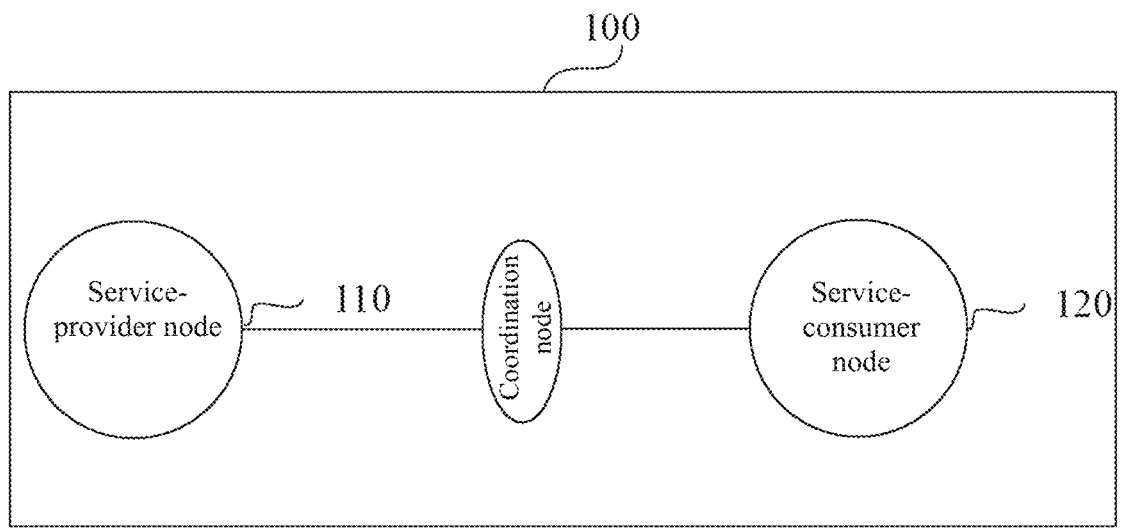
FIG. 1 is a schematic structural diagram of a blockchain-based reconciliation system, according to an embodiment of the specification.

FIG. 1 is a schematic structural diagram of a blockchain-based reconciliation system according to one or more embodiments of the specification. The system may include a service-provider node 110 and a service-consumer node 120.

The service-provider node 110 uploads transaction information to a blockchain, wherein the transaction information comprises an identifier of the service-consumer node.

The transaction information may include information about a transaction between the service-provider node and the service-consumer node. The transaction information may carry an identifier of the service-consumer node so that the service-consumer node can monitor and obtain the transaction information after the transaction information is uploaded to the blockchain. It should be understood that, to facilitate information exchange between nodes in the blockchain, each node that joins the blockchain needs to have a unique identifier. The identifier of the service-consumer node is a unique identifier of the service-consumer node in the blockchain.

In an embodiment, to make it convenient for the service-consumer node to check and confirm the transaction information after monitoring and receiving the transaction information, the transaction information may further carry a transaction contract, a transaction amount, a transaction fee, or a calculation rule of the transaction fee.

For defining rights and obligations of the service-provider node and the service-consumer node in a transaction process, the transaction contract may include information such as a service item (for example, the service-consumer node may charge a customer by using a payment platform provided by the service-provider node) that the service-provider node needs to provide to the service-consumer node in the transaction process, the transaction fee that the service-consumer node needs to pay to the service-provider node after the transaction is completed, or the calculation rule of the transaction fee.

The transaction fee may be a fixed amount agreed in advance between the service-provider node and the service-consumer node, or may be an amount determined based on an actual transaction situation according to a transaction fee calculation rule agreed in advance. For example, the calculation rule of the transaction fee may include determining the transaction fee according to a quantity of transactions performed by the service-consumer node by using the service-provider node (that is, a transaction fee per transaction may be specified), or may include determining the transaction fee according to an amount of a transaction performed by the service-consumer node by using the service-provider node (that is, a transaction fee per transaction amount of 1000 Yuan may be specified).

In an embodiment, for ease of determining that the transaction contract is a contract determined through negotiation between the service-provider node and the service-consumer node, to avoid a fact that the transaction contract is maliciously tampered with or forged, in one or more embodiments of the specification, the transaction contract may be a transaction contract obtained after the service-provider node performs encryption based on a private key and a signature of the service-provider node.

In an embodiment, for ease of broadcasting the transaction information in the blockchain, the uploading, by the service-provider node, transaction information to a blockchain includes: packaging, by the service-provider node, the transaction information into a transaction block; and uploading, by the service-provider node, the transaction block to the blockchain, to broadcast the transaction block to one or more of the one or more service-provider nodes and the one or more service-consumer nodes for adding to the blockchain.

It should be understood that, the transaction block comprises the identifier of the service-consumer node, and the identifier of the service-consumer node may be used as a node identifier for receiving the transaction block, so that when monitoring messages broadcast in the blockchain, the service-consumer node can accurately obtain a transaction block including the identifier of the service-consumer node.

The service-consumer node 120 monitors and obtains the transaction information based on the identifier of the service-consumer node; and the service-consumer node updates a ledger of the service-consumer node based on the transaction information if the service-consumer node confirms the transaction information.

To improve the efficiency of reconciliation between institutions (namely, the service-provider node and the service-consumer node), in this embodiment of the specification, by using a characteristic that information broadcast to the blockchain usually comprises an identifier of a receive node, the service-consumer node can monitor and obtain the transaction information based on the identifier of the service-consumer node. In other words, when monitoring information broadcast to the blockchain, among transaction information, the service-consumer node monitors and obtains only transaction information carrying an identifier of a receive node being the identifier of the service-consumer node.

After the service-consumer node monitors and obtains the transaction information carrying the identifier of the receive node being the identifier of the service-consumer node, to improve the reconciliation efficiency of the transaction fee included in the transaction information, the service-consumer node re-calculates the transaction fee in the transaction information based on the transaction contract, the transaction amount, the transaction fee, or the calculation rule of the transaction fee that are carried in the transaction information, and may confirm the transaction information if determining that the calculated transaction fee is consistent with an amount of the transaction fee carried in the transaction information.

In an embodiment, for ease of tracing the transaction information, to avoid a fact that the transaction information is tampered with, the service-consumer node may add the transaction information to a ledger of the service-consumer node. It should be understood that, the ledger of the service-consumer node is a blockchain ledger allocated to each of the service-consumer nodes in the blockchain, and used to record data of transactions between nodes. Then, the updating, by the service-consumer node, a ledger of the service-consumer node based on the transaction information includes: adding, by the service-consumer node, the transaction contract, the transaction amount, the transaction fee, or the calculation rule of the transaction fee to the ledger of the service-consumer node based on the transaction information; and initializing, by the service-consumer node, a settlement state of the transaction fee in the ledger of the service-consumer node.

To completely record a settlement process of the transaction fee, to facilitate effective evidence collection of judiciary or other related institutions when a settlement dispute occurs subsequently, in an embodiment of the specification, when the service-consumer node adds the transaction contract, the transaction amount, the transaction fee, or the calculation rule of transaction fee to the ledger of the service-consumer node based on the transaction information, the settlement state of the transaction fee may be initialized in the ledger of the service-consumer node.

It should be understood that, in this case, the transaction fee is still in a pending stage, that is, has not been settled. Therefore, the initialized settlement state of the transaction fee may be an "unsettled" state or blank, to indicate that the transaction fee is in an unsettled state.

In an embodiment, to facilitate timely update of the settlement state of the transaction fee, after the service-consumer node updates the ledger of the service-consumer node based on the transaction information, the service-consumer node uploads a settlement result of the transaction fee to the blockchain, to broadcast the settlement result of the transaction fee, and the service-consumer node updates the settlement state of the transaction fee in the ledger of the service-consumer node based on the settlement result of the transaction fee.

To enable the service-provider node to timely confirm and record the settlement result of the transaction fee, the settlement result of the transaction fee that is uploaded by the service-consumer node to the blockchain may further carry an identifier of the service-provider node, so that the service-provider node monitors or obtains the settlement result of the transaction fee based on the identifier of the service-provider node among information broadcast in the blockchain.

In this case, the service-consumer node may update the settlement state of the transaction fee in the ledger of the service-consumer node based on the settlement result of the transaction fee, to switch the settlement state of the transaction fee from "unsettled" to "settled" or from the blank state to "settled."

In an embodiment, because confirmation of the transaction information involves the service-provider node and the service-consumer node, after the service-consumer node confirms the transaction information, the service-provider node may also add the transaction contract, the transaction amount, the transaction fee, or the calculation rule of the transaction fee to a ledger of the service-provider node based on the transaction information, and the service-provider node initializes a settlement state of the transaction fee in the ledger of the service-provider node.

It should be understood that, to timely obtain a transaction information confirmation status of the service-consumer node, in this embodiment of the specification, the transaction information confirmation status of the service-consumer node may be further obtained timely based on a feedback mechanism in the blockchain by using a coordination node in the blockchain. In other words, after confirming the obtained transaction information, the service-consumer node may send a confirmation completion message to the coordination node in the blockchain, and the coordination node forwards the confirmation completion message to the service-provider node, so that the service-provider node timely obtains a feedback result of the service-consumer node.

The service-provider node initializes the settlement state of the transaction fee in the ledger of the service-provider node. The settlement state of the transaction fee may be "unsettled" or may be blank.

In an embodiment, settlement of the transaction fee is usually performed by the service-consumer node based on the transaction fee in the transaction information provided by the service-provider node. In other words, the transaction fee is usually paid by the service-consumer node to the service-provider node. Therefore, after the transaction fee is settled, to make the settlement result timely and valid, in this embodiment of the specification, the settlement result of the transaction fee comprises the identifier of the service-provider node. After the service-consumer node uploads the settlement result of the transaction fee to the blockchain, the service-provider node monitors and obtains the settlement result of the transaction fee based on the identifier of the service-provider node, and the service-provider node updates the settlement state of the transaction fee in the ledger of the service-provider node based on the settlement result of the transaction fee if the service-provider node confirms the settlement result of the transaction fee.

Specifically, the service-provider node may confirm the settlement result of the transaction fee based on actual settlement that is performed off the blockchain by the service-consumer node on the transaction fee of the service-provider node. For example, the service-provider node may obtain a transaction fee amount paid off the blockchain by the service-consumer node to the service-provider node, and determine whether the transaction fee amount is consistent with an amount in the settlement result of the transaction fee. The service-provider node may confirm the settlement result of the transaction fee if the two amounts are consistent.

It should be understood that, a confirm status of the settlement result of the transaction fee may also be fed back to the service-consumer node by using the coordination node in the blockchain. The service-provider node may send to the service-consumer node via the coordination node, a second confirmation completion message upon confirmation of the settlement result. In addition, the service-provider node may specifically update the settlement state of the transaction fee in the ledger of the service-provider node by switching the settlement state of the transaction fee in the ledger from "unsettled" to "settled" or from the blank state to "settled."

Figure 2:
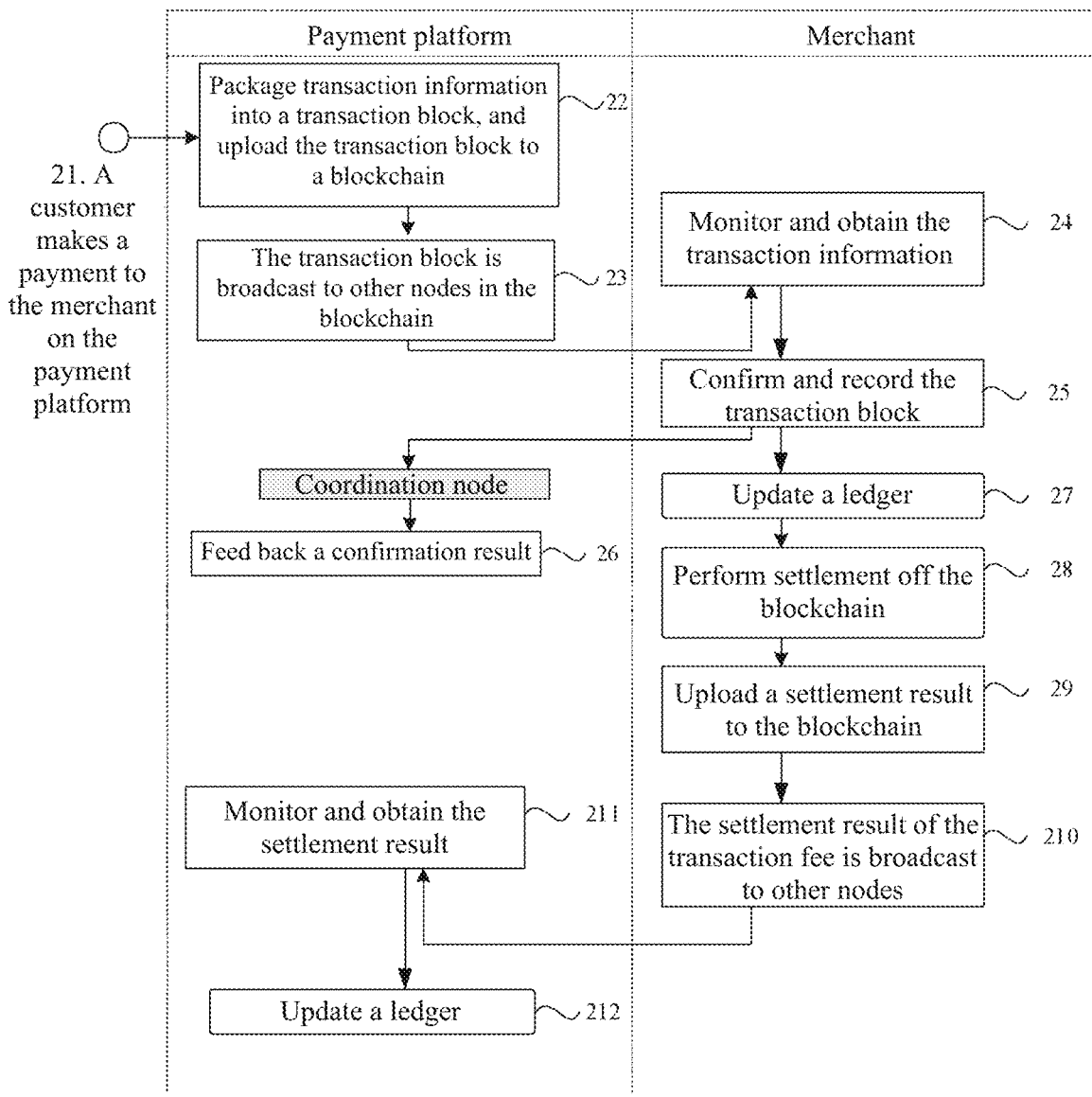
FIG. 2 is a schematic diagram of a blockchain-based reconciliation method in an actual scenario, according to an embodiment of the specification.

An implementation process of a method provided in an embodiment of the specification is described below in detail by using an example that a service-provider node is a payment platform B that joins a blockchain and a service-consumer node is a merchant A using the payment platform B. FIG. 2 is a schematic diagram of a process of reconciliation between the merchant A and the payment platform B, which includes following steps.

S21, the merchant A obtains, on the payment platform B, a fund paid by a customer.

S22, the payment platform B packages transaction information related to the fund, such as a transaction amount, a transaction contract, a transaction fee, or a calculation rule of the transaction fee, to obtain a packaged transaction block, and uploads the transaction block to the blockchain, wherein an identifier of a receive node carried in the transaction block is an identifier a of the merchant A in the blockchain.

S23, the transaction block is broadcast to other nodes in the blockchain.

S24, the merchant A monitors and obtains the transaction information based on the identifier a.

S25, the merchant A confirms the transaction fee in the transaction information based on the transaction amount, the transaction contract, the transaction fee, or the calculation rule of the transaction fee.

S26, the merchant A feeds back a confirmation result to the payment platform B by using a coordination node in the blockchain.

S27, the merchant A writes the transaction information to a ledger of the merchant A, and initializes a settlement state of the transaction fee in the ledger of the merchant A.

S28, the merchant A settles the transaction fee for the payment platform B off the blockchain.

S29, the merchant A uploads a settlement result of the transaction fee to the blockchain, wherein the settlement result of the transaction fee comprises an identifier b of the payment platform B in the blockchain, and the merchant A updates the settlement state of the transaction fee in the ledger of the merchant A based on the settlement result of the transaction fee.

S210, the settlement result of the transaction fee is broadcast to other nodes in the blockchain.

S211, the payment platform B monitors and obtains the settlement result of the transaction fee based on the identifier b.

S212, the payment platform B updates a settlement state of the transaction fee in a ledger of the payment platform B after confirming the settlement result of the transaction fee.

Figure 3:
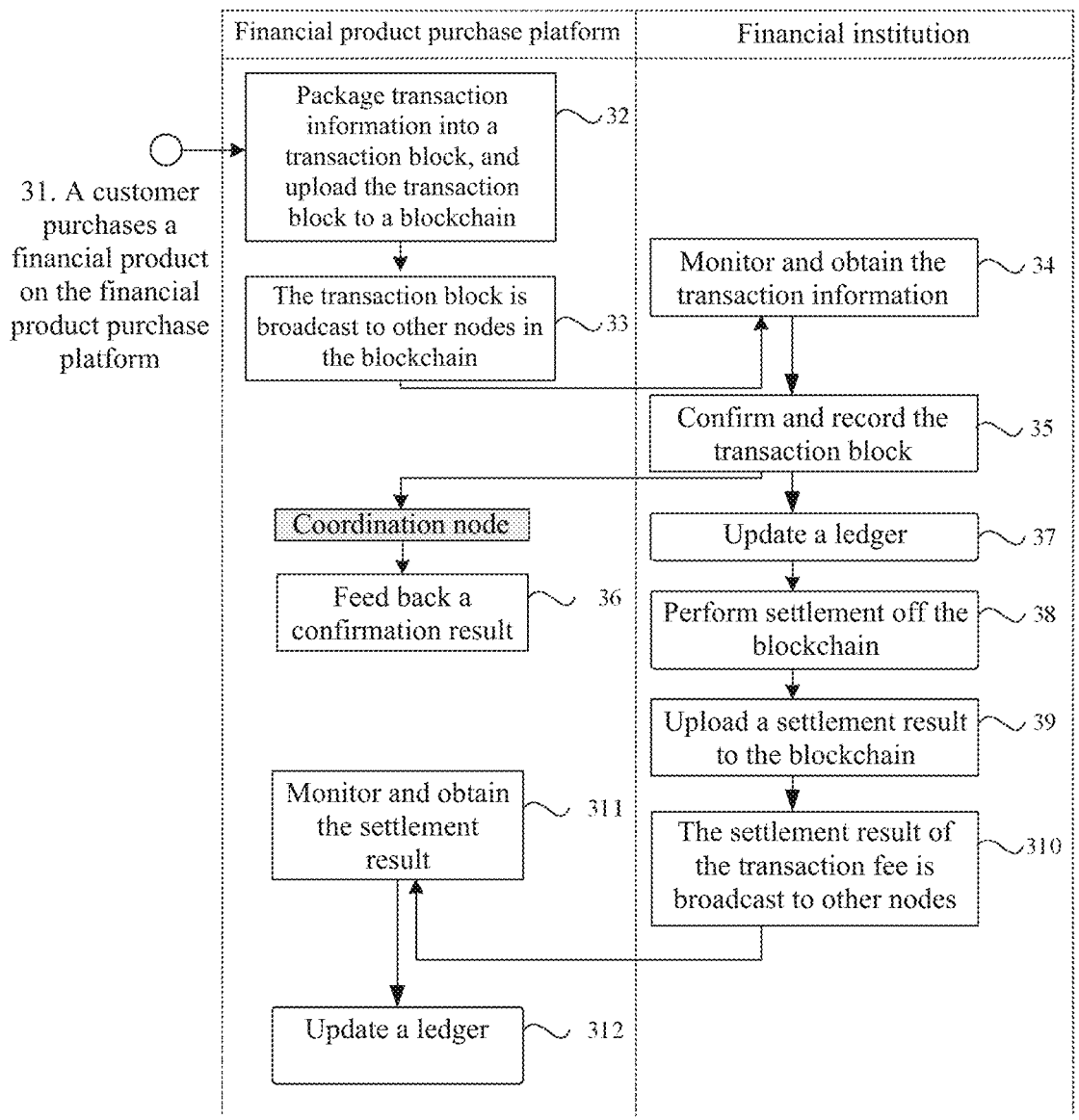
FIG. 3 is a schematic diagram of a blockchain-based reconciliation method in another actual scenario, according to an embodiment of the specification.

An implementation process of a method provided in an embodiment of the specification is described below in detail by using an example that a service-provider node is a financial product purchase platform C that joins a blockchain and a service-consumer node is a financial institution D that issues a financial product based on the financial product purchase platform. FIG. 3 is a schematic diagram of a process of reconciliation between the financial product purchase platform C and the financial institution D, including:

S31, the financial institution D obtains, on the financial product purchase platform C, a fund that is paid by a customer for a financial product e.

S32, the financial product purchase platform B packages transaction information related to the fund, such as a transaction amount, a transaction contract, a transaction fee, or a calculation rule of the transaction fee, to obtain a packaged transaction block, and uploads the transaction block to the blockchain, wherein an identifier of a receive node carried in the transaction block is an identifier d of the financial institution D in the blockchain.

S33, the transaction block is broadcast to other nodes in the blockchain.

S34, the financial institution D monitors and obtains the transaction information based on the identifier d.

S35, the financial institution D confirms the transaction fee in the transaction information based on the transaction amount, the transaction contract, the transaction fee, and the calculation rule of the transaction fee.

The calculation rule of the transaction fee may include charging a transaction fee of a specific percentage per thousand Yuan, for example, charging a transaction fee of 0.15% per thousand Yuan.

S36, the financial institution D feeds back a confirmation result to the financial product purchase platform C by using a coordination node in the blockchain.

S37, the financial institution D writes the transaction information to a ledger of the financial institution D, and initializes a settlement state of the transaction fee in the ledger of the financial institution D.

S38, the financial institution D settles the transaction fee for the financial product purchase platform C off the blockchain.

S39, the financial institution D uploads a settlement result of the transaction fee to the blockchain, wherein the settlement result of the transaction fee comprises an identifier c of the financial product purchase platform C in the blockchain, and the financial institution D updates the settlement state of the transaction fee in the ledger of the financial institution D based on the settlement result of the transaction fee.

S310, the settlement result of the transaction fee is broadcast to other nodes in the blockchain.

S311, the financial product purchase platform C monitors and obtains the settlement result of the transaction fee based on the identifier c.

S312, the financial product purchase platform C updates a settlement state of the transaction fee in a ledger of the financial product purchase platform C after confirming the settlement result of the transaction fee.

In the embodiments of the specification, a service provider and a service consumer may join a blockchain as nodes in the blockchain, namely, a service-provider node and a service-consumer node. In this way, during reconciliation between the service-provider node and the service-consumer node, the service-provider node may upload transaction information to the blockchain. The transaction information may carry an identifier of the service-consumer node. The service-consumer node can monitor and obtain the transaction information based on the identifier of the service-consumer node. The service-consumer node may update a ledger of the service-consumer node based on the transaction information if the service-consumer node confirms the transaction information. Once the service-provider node uploads the transaction information to the blockchain, a confirmation result of the transaction information can be obtained from the service-consumer node, and the transaction information is recorded only when confirmed. Therefore, the transaction information in the blockchain is highly reliable, and after the transaction information is generated, the service provider or the service consumer does not need to consume much time for confirmation.

Figure 4:
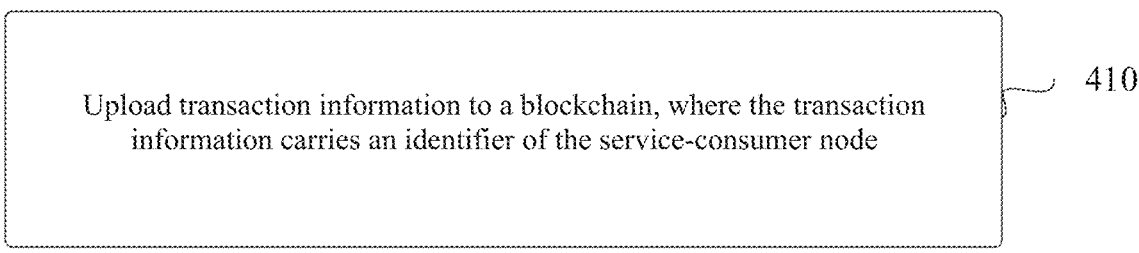
FIG. 4 is a schematic flowchart of a blockchain-based reconciliation method implemented on a service-provider node, according to an embodiment of the specification.

FIG. 4 is a schematic flowchart of a blockchain-based reconciliation method implemented on a service-provider node according to an embodiment of the specification. The blockchain-based reconciliation may be implemented on a blockchain network that comprises one or more service-provider nodes and one or more service-consumer nodes. The method may include followings.

Step 410, upload transaction information to a blockchain, wherein the transaction information comprises an identifier of the service-consumer node. The service-consumer node monitors and obtains the transaction information based on the identifier of the service-consumer node and information associated with a transaction fee. The service-consumer node initializes a settlement state of the transaction fee in a ledger of the service-provider node. The service-consumer node updates a ledger of the service-consumer node based on the transaction information if the service-consumer node confirms the transaction information.

In an embodiment, the uploading transaction information to a blockchain includes: packaging the transaction information into a transaction block; and uploading the transaction block to the blockchain, to broadcast the transaction block to one or more of the one or more service-provider nodes and the one or more service-consumer nodes for adding to the blockchain.

In an embodiment, the transaction information comprises a transaction contract, a transaction amount, a transaction fee, or a calculation rule of the transaction fee.

In an embodiment, after the service-consumer node confirms the transaction information, the method further includes: adding the transaction contract, the transaction amount, the transaction fee, and the calculation rule of the transaction fee to a ledger of the service-provider node based on the transaction information; and initializing a settlement state of the transaction fee in the ledger of the service-provider node.

In an embodiment, after the service-consumer node uploads a settlement result of the transaction fee to the blockchain, wherein the settlement result of the transaction fee comprises an identifier of the service-provider node, the method further includes: monitoring and obtaining the settlement result of the transaction fee based on the identifier of the service-provider node; and updating a settlement state of the transaction fee in the ledger of the service-provider node based on the settlement result of the transaction fee if the settlement result of the transaction fee is confirmed.

For specific implementation of a related step in the embodiment shown in FIG. 4, reference may be made to specific implementation of a related step in the embodiments shown in FIG. 1 to FIG. 3. Details are not described again in one or more embodiments of the specification.

In the embodiments of the specification, a service provider and a service consumer may join a blockchain as nodes in the blockchain, namely, a service-provider node and a service-consumer node. In this way, during reconciliation between the service-provider node and the service-consumer node, the service-provider node may upload transaction information to the blockchain. The transaction information may carry an identifier of the service-consumer node. The service-consumer node can monitor and obtain the transaction information based on the identifier of the service-consumer node. The service-consumer node may update a ledger of the service-consumer node based on the transaction information if the service-consumer node confirms the transaction information. Once the service-provider node uploads the transaction information to the blockchain, a confirmation result of the transaction information can be obtained from the service-consumer node, and the transaction information is recorded only when confirmed. Therefore, the transaction information in the blockchain is highly reliable, and after the transaction information is generated, the service provider or the service consumer does not need to consume much time for confirmation.

Figure 5:
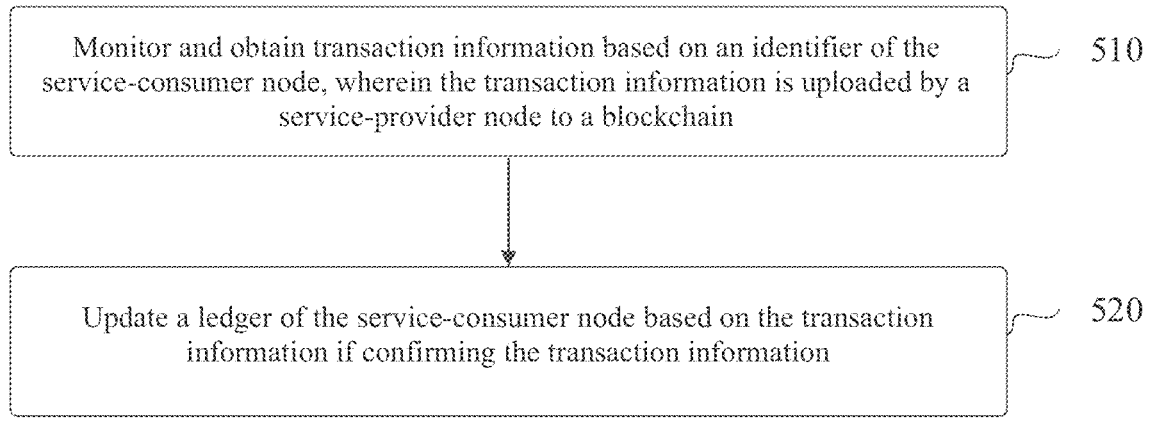
FIG. 5 is a schematic flowchart of a blockchain-based reconciliation method implemented on a service-consumer node, according to an embodiment of the specification.

FIG. 5 is a schematic flowchart of a blockchain-based reconciliation method implemented on a service-consumer node according to an embodiment of the specification. The method may include:

Step 510, monitor and obtain transaction information based on an identifier of the service-consumer node, wherein the transaction information is uploaded by a service-provider node to a blockchain, and the transaction information comprises the identifier of the service-consumer node.

Step 520, update a ledger of the service-consumer node based on the transaction information if the transaction information is confirmed.

In an embodiment, the transaction information comprises a transaction contract, a transaction amount, a transaction fee, and a calculation rule of the transaction fee.

In an embodiment, the updating a ledger of the service-consumer node based on the transaction information includes: adding the transaction contract, the transaction amount, the transaction fee, and the calculation rule of the transaction fee to the ledger of the service-consumer node based on the transaction information; and initializing a settlement state of the transaction fee in the ledger of the service-consumer node.

In an embodiment, after the updating a ledger of the service-consumer node based on the transaction information, the method further includes: uploading a settlement result of the transaction fee to the blockchain, to broadcast the settlement result of the transaction fee to the blockchain; and updating the settlement state of the transaction fee in the ledger of the service-consumer node based on the settlement result of the transaction fee.

For specific implementation of a related step in the embodiment shown in FIG. 5, reference may be made to specific implementation of a related step in the embodiments shown in FIG. 1 to FIG. 3. Details are not described again in one or more embodiments of the specification.

In the embodiments of the specification, a service provider and a service consumer may join a blockchain as nodes in the blockchain, namely, a service-provider node and a service-consumer node. In this way, during reconciliation between the service-provider node and the service-consumer node, the service-provider node may upload transaction information to the blockchain. The transaction information may comprise an identifier of the service-consumer node. The service-consumer node can monitor and obtain the transaction information based on the identifier of the service-consumer node. The service-consumer node may update a ledger of the service-consumer node based on the transaction information if the service-consumer node confirms the transaction information. Once the service-provider node uploads the transaction information to the blockchain, a confirmation result of the transaction information can be obtained from the service-consumer node, and the transaction information is recorded only when confirmed. Therefore, the transaction information in the blockchain is highly reliable, and after the transaction information is generated, the service provider or the service consumer does not need to consume much time for confirmation.

Figure 6:
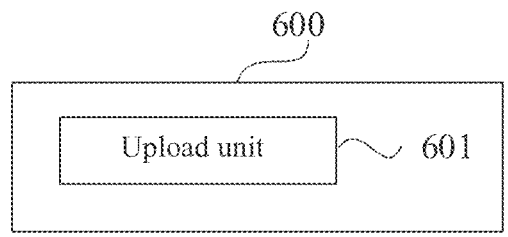
FIG. 6 is a schematic structural diagram of a service-provider node, according to an embodiment of the specification.

FIG. 6 is a schematic structural diagram of a service-provider node 600 according to an embodiment of the specification. In a software implementation, the service-provider node 600 may include an upload unit 601.

The upload unit 601 uploads transaction information to a blockchain, wherein the transaction information comprises an identifier of the service-consumer node; the service-consumer node monitors and obtains the transaction information based on the identifier of the service-consumer node; and the service-consumer node updates a ledger of the service-consumer node based on the transaction information if the service-consumer node confirms the transaction information.

In an embodiment, the upload unit 601 is configured to: package the transaction information into a transaction block; and upload the transaction block to the blockchain, to broadcast the transaction block to one or more of the one or more service-provider nodes and the one or more service-consumer nodes for adding to the blockchain.

In an embodiment, the transaction information comprises a transaction contract, a transaction amount, a transaction fee, or a calculation rule of the transaction fee.

In an embodiment, after the service-consumer node confirms the transaction information, the apparatus further includes: an addition unit (not shown in the figure), for adding the transaction contract, the transaction amount, the transaction fee, or the calculation rule of the transaction fee to a ledger of the service-provider node based on the transaction information; and an initialization unit (not shown in the figure), for initializing a settlement state of the transaction fee in the ledger of the service-provider node.

In an embodiment, after the service-consumer node uploads a settlement result of the transaction fee to the blockchain, wherein the settlement result of the transaction fee comprises an identifier of the service-provider node, the apparatus further includes: an obtaining unit (not shown in the figure), for monitoring and obtaining the settlement result of the transaction fee based on the identifier of the service-provider node; and a state updating unit (not shown in the figure), for updating the settlement state of the transaction fee in the ledger of the service-provider node based on the settlement result of the transaction fee if the service-provider node confirms the settlement result of the transaction fee.

The service-provider node 600 can implement the method in the method embodiment in FIG. 4. Details may be referred to the blockchain-based reconciliation method in the embodiment shown in FIG. 4, which will not be described again.

Figure 7:
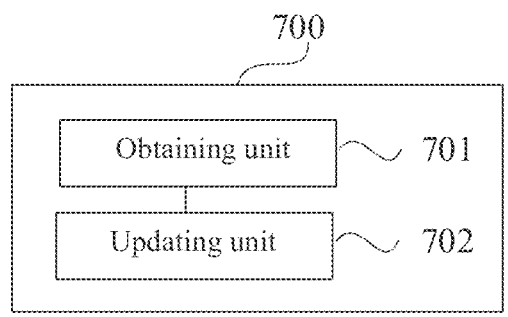
FIG. 7 is a schematic structural diagram of a service-consumer node, according to an embodiment of the specification.

FIG. 7 is a schematic structural diagram of a service-consumer node 700 according to an embodiment of the specification. In a software implementation, the service-consumer node 700 may include: an obtaining unit 701 and an updating unit 702.

The obtaining unit 701 monitors and obtains transaction information based on an identifier of the service-consumer node, wherein the transaction information is uploaded by a service-provider node to a blockchain, and the transaction information comprises the identifier of the service-consumer node.

The updating unit 702 updates a ledger of the service-consumer node based on the transaction information if the transaction information is confirmed.

In an embodiment, the transaction information comprises a transaction contract, a transaction amount, a transaction fee, or a calculation rule of the transaction fee.

In an embodiment, the updating unit 702 is configured to: add the transaction contract, the transaction amount, the transaction fee, and the calculation rule of the transaction fee to the ledger of the service-consumer node based on the transaction information; and initialize a settlement state of the transaction fee in the ledger of the service-consumer node.

In an embodiment, after the updating unit 702 updates the ledger of the service-consumer node based on the transaction information, the apparatus further includes: an upload unit (not shown in the figure), for uploading a settlement result of the transaction fee to the blockchain, to broadcast the settlement result of the transaction fee; and a state updating unit (not shown in the figure), for updating the settlement state of the transaction fee in the ledger of the service-consumer node based on the settlement result of the transaction fee.

The service-consumer node 700 can implement the method in the method embodiment in FIG. 5. Details may be referred to the blockchain-based reconciliation method in the embodiment shown in FIG. 5, which will not be described again.

Figure 8:
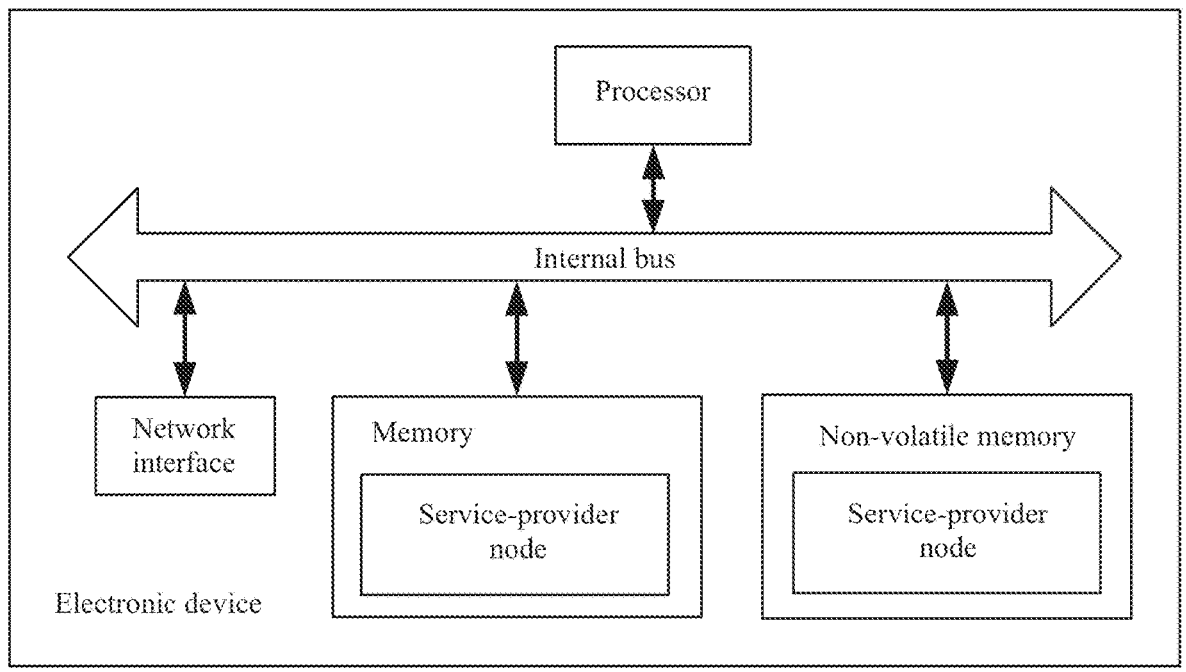
FIG. 8 is a schematic structural diagram of an electronic device, according to an embodiment of the specification.

FIG. 8 is a schematic structural diagram of an electronic device according to an embodiment of the specification. Referring to FIG. 8, in an embodiment, at the hardware level, the electronic device includes a processor, an internal bus, a network interface, and a memory. The memory may include a memory, for example, a random access memory (RAM), or may further include a non-volatile memory, for example, at least one magnetic disk memory. Certainly, the electronic device may further include hardware required for other services.

The processor, the network interface, and the memory may be connected to each other through the internal bus. The internal bus may be an industry standard architecture (ISA) bus, a peripheral component interconnect (PCI) bus, or an extended industry standard architecture (EISA) bus. The bus may be classified into an address bus, a data bus, a control bus, and the like. For ease of illustration, in FIG. 8, the bus is represented by using only one double-sided arrow. This, however, does not indicate that there is only one bus or only one type of bus.

The memory is configured to store a program. Specifically, the program may include program code, wherein the program code includes a computer operation instruction. The memory may include an internal memory and a non-volatile memory, and provide instructions and data to the processor.

The processor reads a corresponding computer program from the non-volatile memory into the memory and then executes the computer program, to form a service-provider node at the logic level. The processor executes the program stored in the memory and is specifically configured to perform the following operations: uploading transaction information to a blockchain, wherein the transaction information comprises an identifier of the service-consumer node and information associated with a transaction fee; the service-consumer node monitors and obtains the transaction information based on the identifier of the service-consumer node; and the service-consumer node updates a ledger of the service-consumer node based on the transaction information if the service-consumer node confirms the transaction information.

The foregoing blockchain-based reconciliation method disclosed in the embodiments shown in FIG. 4 of the specification may be applied to a processor or implemented by a processor. The processor may be an integrated circuit chip and has a signal processing capability. In an embodiment, steps of the foregoing method may be implemented by using a hardware integrated logic circuit in the processor or instructions in a form of software. The processor may be a general processor, including a central processing unit (CPU), a network processor (NP), and the like; or may further be a digital signal processor (DSP), an application-specific integrated circuit (ASIC), a field programmable gate array (FPGA), or another programmable logical device, discrete gate or transistor logical device, or discrete hardware component. The processor can implement or execute each method, step, and logic block diagram disclosed in one or more embodiments of the specification. The general-purpose processor may be a microprocessor, or the processor may be any conventional processor or the like. Steps of the method disclosed with reference to one or more embodiments of the specification may be directly implemented by a hardware decoding processor, or implemented by a combination of hardware in the decoding processor and a software module. The software module may be located in a mature storage medium in the art, such as a RAM, a flash memory, a ROM, a programmable ROM, an electrically erasable programmable memory, or a register. The storage medium is located in the memory, and the processor reads information in the memory and completes the steps in the foregoing methods in combination with hardware of the processor.

The electronic device may further perform the blockchain-based reconciliation method shown in FIG. 4, and this will not be described in the specification again.

Definitely, in addition to a software implementation, the electronic device in the specification does not exclude other implementations, for example, a logic device or a combination of software and hardware. In other words, an entity executing the following processing procedure is not limited to the logic units, and may also be hardware or logic devices.

Figure 9:
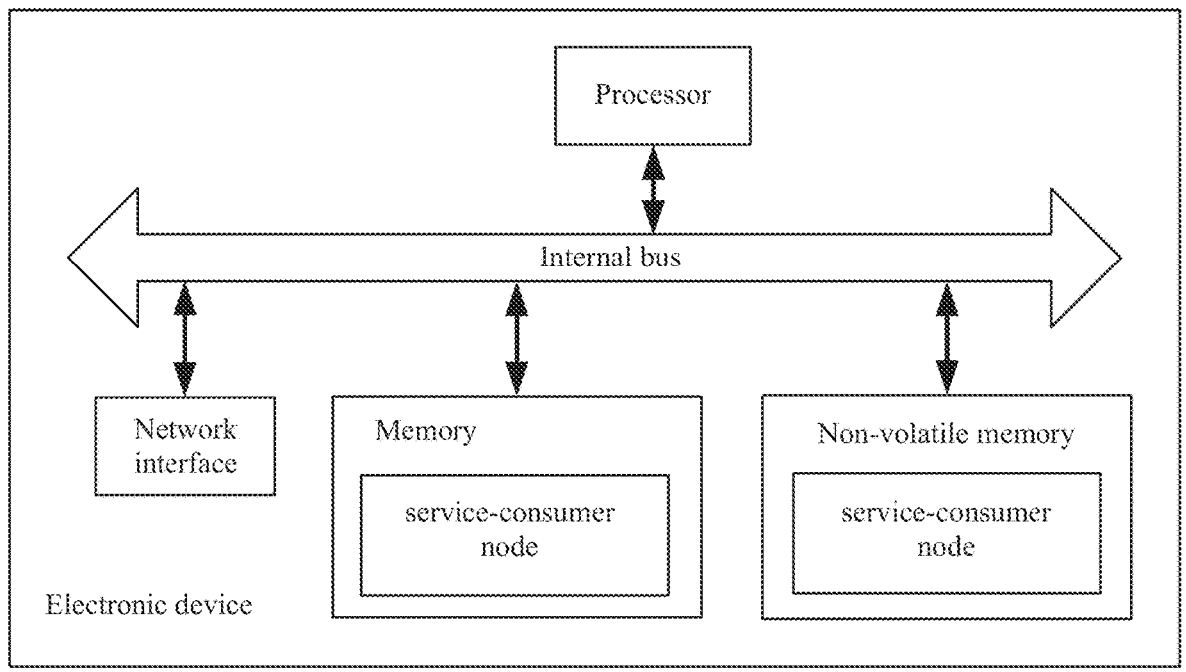
FIG. 9 is a schematic structural diagram of another electronic device, according to an embodiment of the specification.

FIG. 9 is a schematic structural diagram of an electronic device according to an embodiment of the specification. Referring to FIG. 9, at the hardware level, the electronic device includes a processor, and In an embodiment, includes an internal bus, a network interface, and a memory. The memory may include a memory, for example, a random access memory (RAM), or may further include a non-volatile memory, for example, at least one magnetic disk memory. Certainly, the electronic device may further include hardware required for other services.

The processor, the network interface, and the memory may be connected to each other through the internal bus. The internal bus may be an industry standard architecture (ISA) bus, a peripheral component interconnect (PCI) bus, or an extended industry standard architecture (EISA) bus. The bus may be classified into an address bus, a data bus, a control bus, and the like. For ease of illustration, in FIG. 9, the bus is represented by using only one double-sided arrow. This, however, does not indicate that there is only one bus or only one type of bus.

The memory is configured to store a program. Specifically, the program may include program code, wherein the program code includes a computer operation instruction. The memory may include an internal memory and a non-volatile memory, and provide instructions and data to the processor.

The processor reads a corresponding computer program from the non-volatile memory into the memory and then executes the computer program, to form a service-consumer node at the logic level. The processor executes the program stored in the memory and is specifically configured to perform the following operations: monitoring and obtaining transaction information based on an identifier of the service-consumer node, wherein the transaction information is uploaded by a service-provider node to a blockchain, and the transaction information comprises the identifier of the service-consumer node; and updating a ledger of the service-consumer node based on the transaction information if confirming the transaction information.

The foregoing blockchain-based reconciliation method disclosed in the embodiments shown in FIG. 5 of the specification may be applied to a processor or implemented by a processor. The processor may be an integrated circuit chip and has a signal processing capability. In an embodiment, steps of the foregoing method may be implemented by using a hardware integrated logic circuit in the processor or instructions in a form of software. The processor may be a general processor, including a central processing unit (CPU), a network processor (NP), and the like; or may further be a digital signal processor (DSP), an application-specific integrated circuit (ASIC), a field programmable gate array (FPGA), or another programmable logical device, discrete gate or transistor logical device, or discrete hardware component. The processor can implement or execute each method, step, and logic block diagram disclosed in one or more embodiments of the specification. The general-purpose processor may be a microprocessor, or the processor may be any conventional processor or the like. Steps of the method disclosed with reference to one or more embodiments of the specification may be directly implemented by a hardware decoding processor, or implemented by a combination of hardware in the decoding processor and a software module. The software module may be located in a mature storage medium in the art, such as a RAM, a flash memory, a ROM, a programmable ROM, an electrically erasable programmable memory, or a register. The storage medium is located in the memory, and the processor reads information in the memory and completes the steps in the foregoing methods in combination with hardware of the processor.

The electronic device may further perform the blockchain-based reconciliation method shown in FIG. 5, and this is not described in the specification again.

Definitely, in addition to a software implementation, the electronic device in the specification does not exclude other implementations, for example, a logic device or a combination of software and hardware. In other words, an entity executing the following processing procedure is not limited to the logic units, and may also be hardware or logic devices.

Embodiments of the specification are described above. Other embodiments fall within the scope of the appended claims. In some embodiments, the actions or steps recorded in the claims may be performed in sequences different from those in the embodiments and an expected result may still be achieved. In addition, the processes depicted in the accompanying drawings do not necessarily require specific sequences or consecutive sequences to achieve an expected result. In some embodiments, multitasking and parallel processing may be feasible or beneficial.

In short, the foregoing descriptions are merely example embodiments of the specification, but are not intended to limit the protection scope of this specification. Any modification, equivalent replacement, or improvement made within the spirit and principle of one or more embodiments of the specification shall fall within the protection scope of one or more embodiments of the specification.

The system, the apparatus, the module or the unit described in the foregoing embodiments can be specifically implemented by a computer chip or an entity or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

When the functions disclosed herein are implemented in the form of software functional units and sold or used as independent products, they can be stored in a processor executable non-volatile computer readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments. The storage medium may comprise a flash drive, a portable hard drive, ROM, RAM, a magnetic disk, an optical disc, another medium operable to store program code, or any combination thereof.

The computer readable medium includes a persistent medium and a non-persistent medium, a removable medium and a non-removable medium, which may implement storage of information by using any method or technology. The information may be a computer readable instruction, a data structure, a module of a program or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the specification, the computer-readable medium does not include transitory computer readable media (transitory media), such as a modulated data signal and a carrier.

It should also be noted that the terms "include", "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

The embodiments in this specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

What is claimed is:

1. A method for blockchain-based reconciliation, implemented on a blockchain comprising a plurality of service-provider nodes and a plurality of service-consumer nodes, comprising:

broadcasting, by a service-provider node, transaction information to all other nodes of the blockchain, wherein the transaction information comprises an identifier of a service-consumer node and information associated with a transaction fee;

receiving, by the service-consumer node, the transaction information from the broadcasting;

determining, by the service-consumer node, whether the transaction information includes the identifier of the service-consumer node;

in response to determining that the transaction information includes the identifier of the service-consumer node, updating, by the service-consumer node, a ledger of the service-consumer node with the transaction information, and sending, by the service-consumer node, a first confirmation completion message to the service-provider node via a coordination node in the blockchain, wherein the coordination node is not the service-provider node nor the service-consumer node;

performing a settlement, by the service-consumer node off the blockchain, with the service-provider node on the transaction fee in parallel with the coordination node sending the first confirmation completion message to the service-provider node;

broadcasting, by the service-consumer node, a settlement result indicating the settlement to all other nodes of the blockchain, wherein the settlement result includes an identifier of the service-provider node;

initializing, by the service-provider node, a settlement state of the transaction fee in a ledger of the service-provider node;

obtaining, by the service-provider node, the settlement result of the transaction fee associated with the transaction information based on the identifier of the service-provider node in the settlement result; and updating, by the service-provider node, the settlement state in the ledger of the service-provider node based on the settlement result upon confirming the settlement result.

2. The method of claim 1, wherein the broadcasting the transaction information to all other nodes of the blockchain comprises:
packaging the transaction information into a transaction block; and
broadcasting the transaction block to the service-provider nodes and the service-consumer nodes for adding to the blockchain.

3. The method of claim 1, wherein the transaction information comprises a transaction contract, a transaction amount, the transaction fee, or a calculation rule of the transaction fee.

4. The method of claim 1, wherein the updating, by the service-consumer node, a ledger of the service-consumer node with the transaction information comprises:
adding the transaction information to the ledger of the service-consumer node; and
initializing a settlement state of the transaction fee in the ledger of the service-consumer node.

5. The method of claim 1, further comprising:
receiving, by the service-provider node from the service-consumer node via the coordination node in the blockchain, the first confirmation completion message; and
sending, by the service-provider node to the service-consumer node via the coordination node, a second confirmation completion message upon confirmation of the settlement result.

6. The method of claim 1, wherein the initializing, by the service-provider node, a settlement state of the transaction fee in a ledger of the service-provider node comprises indicating the settlement state as unsettled.

7. The method of claim 1, wherein the updating, by the service-provider node, the settlement state in the ledger of the service-provider node based on the settlement result upon confirming the settlement result comprises indicating the settlement state as settled.

8. A system for blockchain-based reconciliation, comprising a processor and a non-transitory computer-readable storage medium storing instructions executable by the processor to cause the system to perform operations comprising:
broadcasting from a service-provider node transaction information to all other nodes of a blockchain, wherein the transaction information comprises an identifier of a service-consumer node and information associated with a transaction fee, and the blockchain comprises a plurality of service-provider nodes and a plurality of service-consumer nodes;

receiving at the service-consumer node the transaction information from the broadcasting;

determining whether the transaction information includes the identifier of the service-consumer node;

in response to determining that the transaction information includes the identifier of the service-consumer node, updating a ledger of the service-consumer node with the transaction information, and sending a first confirmation completion message to the service-provider node via a coordination node in the blockchain, wherein the coordination node is not the service-provider node nor the service-consumer node;

performing a settlement, off the blockchain, between the service-provider node and the service-consumer node on the transaction fee in parallel with the coordination node sending the first confirmation completion message to the service-provider node;

broadcasting, from the service-consumer node to all other nodes of the blockchain, a settlement result indicating the settlement, wherein the settlement result includes an identifier of the service-provider node;

initializing a settlement state of the transaction fee in a ledger of the service-provider node;

obtaining the settlement result of the transaction fee associated with the transaction information based on the identifier of the service-provider node in the settlement result; and updating the settlement state in the ledger of the service-provider node based on the settlement result upon confirming the settlement result.

9. The system of claim 8, wherein the broadcasting from a service-provider node the transaction information to all other nodes of the blockchain comprises:
packaging the transaction information into a transaction block; and
broadcasting the transaction block to the service-provider nodes and the service-consumer nodes for adding to the blockchain.

10. The system of claim 8, wherein the transaction information comprises a transaction contract, a transaction amount, the transaction fee, or a calculation rule of the transaction fee.

11. The system of claim 8, wherein the updating a ledger of the service-consumer node with the transaction information comprises:
adding the transaction information to the ledger of the service-consumer node; and
initializing a settlement state of the transaction fee in the ledger of the service-consumer node.

12. The system of claim 8, wherein the operations further comprise:
receiving, by the service-provider node from the service-consumer node via the coordination node in the blockchain, the first confirmation completion message; and sending, by the service-provider node to the service-consumer node via the coordination node, a second confirmation completion message upon confirmation of the settlement result.

13. The system of claim 8, wherein the initializing, by the service-provider node, a settlement state of the transaction fee in a ledger of the service-provider node comprises indicating the settlement state as unsettled.

14. The system of claim 8, wherein the updating, by the service-provider node, the settlement state in the ledger of the service-provider node based on the settlement result upon confirming the settlement result comprises indicating the settlement state as settled.

15. A non-transitory computer-readable storage medium for blockchain-based reconciliation, configured with instructions executable by one or more processors to cause the one or more processors to perform operations comprising:
  broadcasting from a service-provider node transaction information to all other nodes of a blockchain, wherein the transaction information comprises an identifier of a service-consumer node and information associated with a transaction fee, and the blockchain comprises a plurality of service-provider nodes and a plurality of service-consumer nodes;
  receiving at the service-consumer node the transaction information from the broadcasting;
  determining whether the transaction information includes the identifier of the service-consumer node;
  in response to determining that the transaction information includes the identifier of the service-consumer node, updating a ledger of the service-consumer node with the transaction information, and sending a first confirmation completion message to the service-provider node via a coordination node in the blockchain, wherein the coordination node is not the service-provider node nor the service-consumer node;
  performing a settlement, off the blockchain, between the service-provider node and the service-consumer node on the transaction fee in parallel with the coordination node sending the first confirmation completion message to the service-provider node;
  broadcasting, from the service-consumer node to all other nodes of the blockchain, a settlement result indicating the settlement, wherein the settlement result includes an identifier of the service-provider node;
  initializing a settlement state of the transaction fee in a ledger of the service-provider node;
  obtaining the settlement result of the transaction fee associated with the transaction information based on the identifier of the service-provider node in the settlement result; and
  updating the settlement state in the ledger of the service-provider node based on the settlement result upon confirming the settlement result.

16. The medium of claim 15, wherein the broadcasting from a service-provider node the transaction information to all other nodes of the blockchain comprises:
  packaging the transaction information into a transaction block; and
  broadcasting the transaction block to the service-provider nodes and the service-consumer nodes for adding to the blockchain.

17. The medium of claim 15, wherein the updating a ledger of the service-consumer node with the transaction information comprises:
  adding the transaction information to the ledger of the service-consumer node; and
  initializing a settlement state of the transaction fee in the ledger of the service-consumer node.

18. The medium of claim 15, wherein the operations further comprise:
  receiving, by the service-provider node from the service-consumer node via the coordination node in the blockchain, the first confirmation completion message; and
  sending, by the service-provider node to the service-consumer node via the coordination node, a second confirmation completion message upon confirmation of the settlement result.

19. The medium of claim 15, wherein the initializing, by the service-provider node, a settlement state of the transaction fee in a ledger of the service-provider node comprises indicating the settlement state as unsettled.

20. The medium of claim 15, wherein the updating, by the service-provider node, the settlement state in the ledger of the service-provider node based on the settlement result upon confirming the settlement result comprises indicating the settlement state as settled.

* * * * *